United States Patent
Wyatt et al.

(10) Patent No.: US 7,415,625 B2
(45) Date of Patent: Aug. 19, 2008

(54) POLICY TABLE RULE BASED PROCESSOR SIDE BUS SIGNALING

(75) Inventors: David Wyatt, San Jose, CA (US); Bradley N. Saunders, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 11/172,113

(22) Filed: Jun. 29, 2005

(65) Prior Publication Data

US 2007/0006005 A1 Jan. 4, 2007

(51) Int. Cl.
*G06F 1/32* (2006.01)

(52) U.S. Cl. .................. 713/322; 713/300; 713/310; 713/320; 713/321; 713/323; 713/324; 713/330; 713/340; 713/501; 713/600; 361/695; 318/471

(58) Field of Classification Search .............. 713/300, 713/310, 320–324, 330, 340, 501, 600; 361/695; 318/471
See application file for complete search history.

(56) References Cited

U.S. PATENT DOCUMENTS

| 6,470,289 | B1 | 10/2002 | Peters |
| 6,487,668 | B2 * | 11/2002 | Thomas et al. ............... 713/322 |
| 6,535,798 | B1 * | 3/2003 | Bhatia et al. ................. 700/293 |
| 7,058,824 | B2 * | 6/2006 | Plante et al. ................. 713/300 |
| 7,235,943 | B2 * | 6/2007 | Hsiang et al. ............... 318/471 |
| 2003/0050714 | A1 | 3/2003 | Tymchenko |

FOREIGN PATENT DOCUMENTS

WO     03079170 A2    9/2003

* cited by examiner

*Primary Examiner*—Abdelmoniem Elamin
(74) *Attorney, Agent, or Firm*—Kenyon & Kenyon LLP

(57) ABSTRACT

A system and method for selecting a computer hardware component of a computing system to throttle based on a selection policy is disclosed. A co-thermal control system may receive a first signal indicating a first condition for a plurality of computer hardware components has occurred. The co-thermal control system may choose a course of action at least partially based upon the first signal using a table-based rule generator. The co-thermal control system may output instructions to participating components for the course of action.

20 Claims, 7 Drawing Sheets

| PROCHOT# | Pav | dP/dt | ΣP | CPU Throttle |
|---|---|---|---|---|
| Not Asserted | N/A | N/A | N/A | CTC Setting |
| Asserted | Low | N/A | Low | CTC Setting |
| ... | ... | ... | ... | CTC Setting |
| Asserted | Med | Pos | Med | PH1 |
| Asserted | High | Pos | Med | PH2 |
| Asserted | Low | Neg | High | PH2 |
| Asserted | N/A | Pos | High | PH3 |

*Figure 6*

POLICY TABLE RULE BASED PROCESSOR SIDE BUS SIGNALING

BACKGROUND OF THE INVENTION

Embodiments of the invention pertain to cooling systems for computer systems. More particularly, embodiments of the invention pertain to throttling a component of a computer system based on a criterion.

The movement of electrons within the electrical components of a computer system causes a great deal of heat to be generated. Unless the heat is dissipated, it will accumulate, reducing system reliability or causing catastrophic damage to the system. Such damage may include the warping of the electrical components and possible fire hazards.

Currently, thermal sensors are attached to a die to read the actual temperature of the die hot spots. When the hot spot temperatures are exceeded on a particular die, that die reduces its temperature independently of the other die using some form of reduction in work per unit time, also called throttling. This throttling prevents a die from reaching its maximum working temperature and damaging the system. Throttling may be performed by clock gating and clock frequency reduction.

When throttling by clock frequency reduction, additional heat reduction may be possible by proportionally reducing the operating voltage of the die to a level that still meets timing requirements of the die when operating at that reduced frequency. A method such as this may also be referred to as performance scaling.

The throttling may be triggered if the thermal sensors read a throttling threshold temperature up to some maximum tolerable temperature. To ensure safety, this maximum temperature may be set well below a temperature that causes actual catastrophic damage.

Throttling and performance scaling will reduce the amount of work performed by the die to a level below its peak potential. This action is necessary to keep the die operating at a temperature within its specified limits when adversely influenced by an elevated temperature of the environment in which it is operating.

Usually, different components in a system, such as the central unit and the graphics memory and controller hub (GMCH), may share a cooling system for a more efficient design to the computer system. However, these different components often have different cooling needs.

BRIEF DESCRIPTION OF THE DRAWINGS

FIG. 6 illustrates one embodiment of a table to be used by the table-based rule generator in determining a response to a Processor Hot (PROCHOT) signal according to one embodiment of the present invention.

DETAILED DESCRIPTION

A system and method for selecting a computer hardware component (CHC) of a computing system to throttle based on a selection policy is disclosed. A co-thermal control (CTC) system may receive a first signal indicating a first thermal condition for a plurality of CHCs has occurred. The CTC system may choose a course of action at least partially based upon the first signal using a table-based rule generator. The CTC system may output instructions for the course of action. The first signal may be a sensor signal and the course of action may be to send a second signal from a first CHC to a second CHC to throttle the second CHC a proportional amount. Alternately, the first signal may be a Processor Hot (PROCHOT) signal to the first CHC and the course of action may be to throttle the first CHC a proportional amount (e.g., reducing the internal clocking signal by 50%). The first signal may be weighted before being input into the table-based rule generator. The instructions from the table-based rule generator may be weighted. The instructions for the course of action may be further based upon at least one of a state of one of the plurality of CHCs, a power condition, a utilization condition, or a temperature condition.

Figure 1:
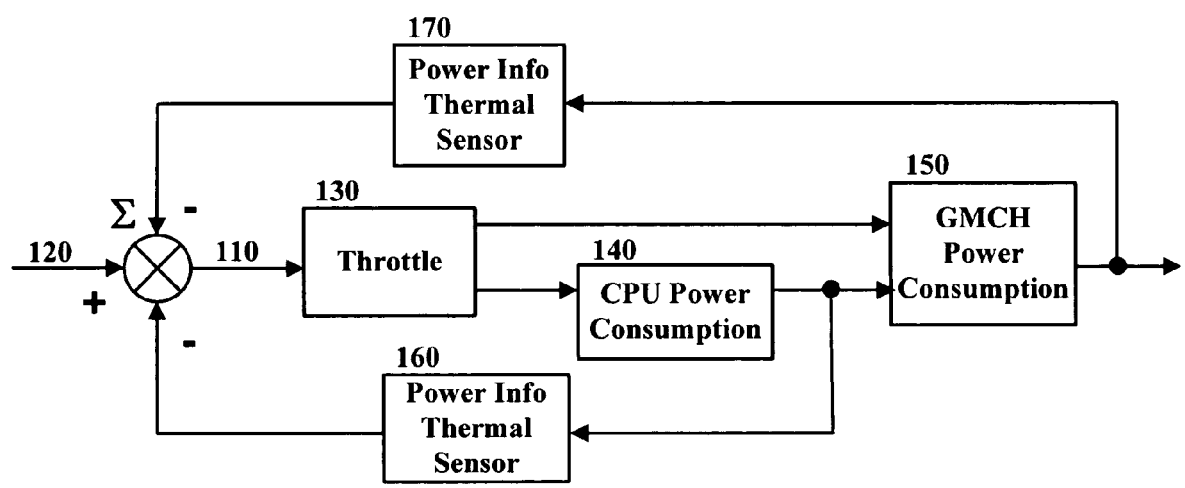
FIG. 1 illustrates one embodiment of a cooling system according to the present invention.

FIG. 1 illustrates one embodiment of a co-thermal control (CTC) system 100 according to the present invention. Based on the error 110, or the amount the power or temperature exceeds the power or temperature budget 120, the CTC system may throttle 130 the power consumption of the CHCs such as CPU 140 and the graphics memory and controller hub (GMCH) 150. The throttling 130 of one of the CHCs may take the throttling 130 of the other CHCs into account. Power, utilization, or temperature information from a first thermal sensor 160 connected to the output of a first CHC and a second thermal sensor 170 connected to the output of a second CHC may be subtracted from the power, utilization, or temperature budget 120 to determine the error 110.

Figure 2:
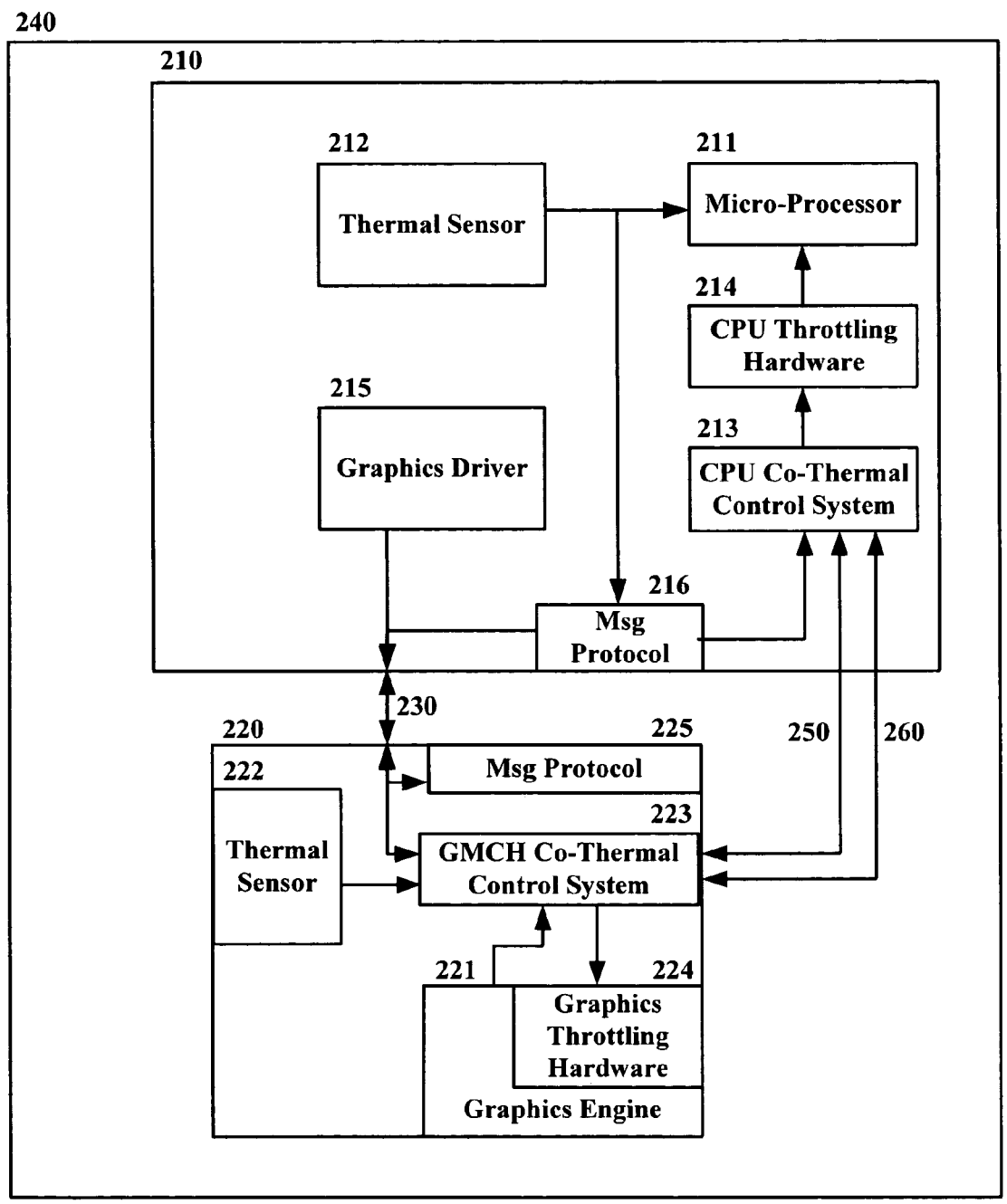
FIG. 2 illustrates one embodiment of a computing system according to the present invention.

FIG. 2 illustrates one embodiment of a computing system 200 according to the present invention. A first computer hardware component, such as a CPU 210, may be coupled to a second computer hardware component, such as a GMCH 220, by a front side bus (FSB) 230. While this description will refer specifically to a CPU and a GMCH, it is to be understood that other components may also be used. For example, the CHC may also be a CPU memory controller hub. Additionally, the system is not limited to just two computer hardware components, as multiple computer hardware components may be interacting within the system. The CPU 210 and the GMCH 220 share a cooling system 240. This cooling system 240 may take one of any number of forms known in the art, such as air circulation units, heat exchangers, or other systems. While the cooling system 240 should be able to handle the sum of the thermal design power (TDP) of both the CPU 210 and the GMCH 220 in most computing systems, in some computing systems this is not the case for various reasons. The TDP for a component is defined as the steady state power for which a thermal solution for that component should be designed so that the component will not exceed any reliability temperature threshold, and is generally quoted at a specific ambient temperature. The maximum power for the CPU 210 and GMCH 220 may be more than the TDP of each device. Since the maximum power is more than the TDP power, physical damage due to overheating may occur when operating beyond the TDP power for a sufficiently long time.

The minimum residual GMCH thermal power budget is the power available to the GMCH 220 when the CPU 210 is at its maximum operating power in steady state. The minimum residual CPU thermal power budget is the power available to the CPU 210 when the GMCH 220 is at its maximum operating power in steady state.

The CPU 210 has a microprocessor 211 to process software instructions. The CPU 210 may have a thermal sensor 212 to detect when the CPU 210 is getting too hot. The thermal sensor 212 may alert a CPU CTC system 213, which may contain throttling control logic to control CPU throttling hardware 214. The CPU CTC system 213 may also control communications between the CPU 210 and the GMCH 220 that pertain to the thermal condition of the system. The throttling hardware 214 may then reduce the amount of processing being performed by the microprocessor. For a computing system 200 that executes graphics, a graphics driver 215 may be used to interact with the GMCH 220 via the FSB 230. Messages may be transmitted via the FSB 230 using the message protocol 216.

The GMCH 220 may have a graphics engine 221 to execute graphics processing. The GMCH 220 may have a thermal sensor 222 to detect when the GMCH 220 is getting too hot. The thermal sensor 222 may alert a GMCH CTC system 223, which may contain throttling control logic to control GMCH throttling hardware 224. The GMCH CTC system 223 may also control communications between the CPU 210 and the GMCH 220 that pertain to the thermal condition of the system. The CTC system may be integrated with either the CPU 210, the GMCH 220, both, or as a separate component. The throttling hardware 224 may then reduce the amount of graphics execution being performed by the microprocessor. Messages may be transmitted via the FSB 230 using the message protocol 225.

The CPU 210 may have a pin 250, such as a PROCHOT pin, which receives a signal from the GMCH 220. Upon receiving the signal, the CPU CTC system 213 may cause the CPU throttling hardware 214 to throttle the microprocessor 211. Additionally, the GMCH 220 may also have a PROCHOT pin 260, which receives a signal from the CPU 210. Upon receiving the signal, the GMCH CTC system 223 may cause the graphics throttling hardware 224 to throttle the graphics engine 221.

Figure 3:
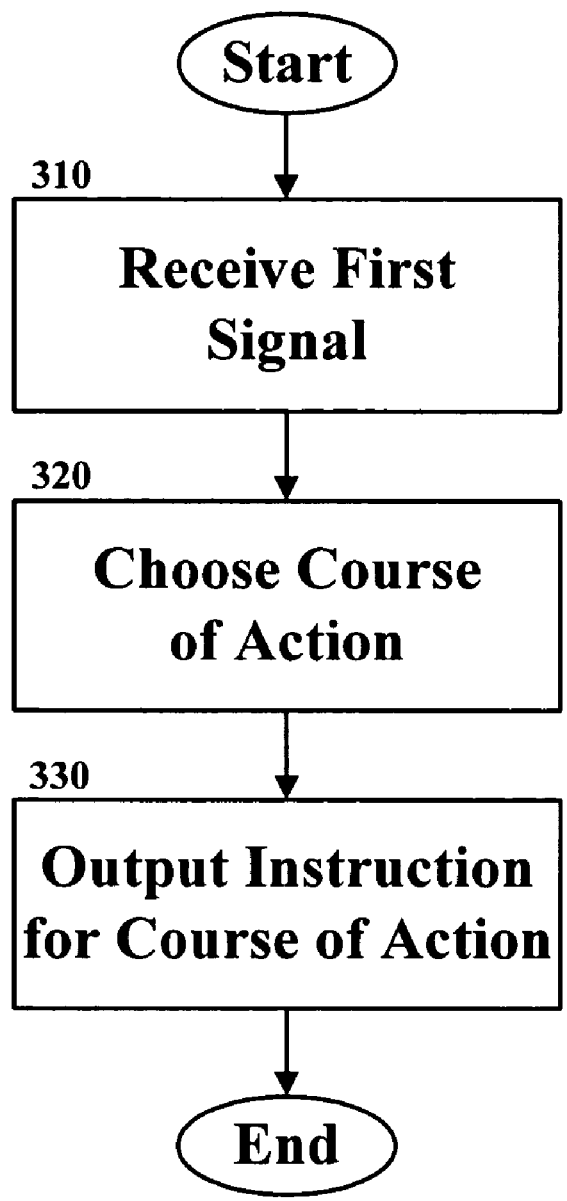
FIG. 3 illustrates in a flowchart one embodiment of a method for using a co-thermal control system 213 to determine a proportional response to a thermal condition according to the present invention.

FIG. 3 illustrates in a flowchart one embodiment of a method 300 for using a CTC system 223 to determine a proportional response to a thermal condition according to the present invention. The CTC system 223 may receive a first signal indicating the thermal condition for a plurality of CHCs (Block 310). The thermal condition may be that either the temperature or the power has exceeded its budget or other conditions. The CTC system 223 may then choose a course of action using a table-based rule generator (Block 320). The CTC system 223 may then output instructions for that course of action (Block 330).

Figure 4:
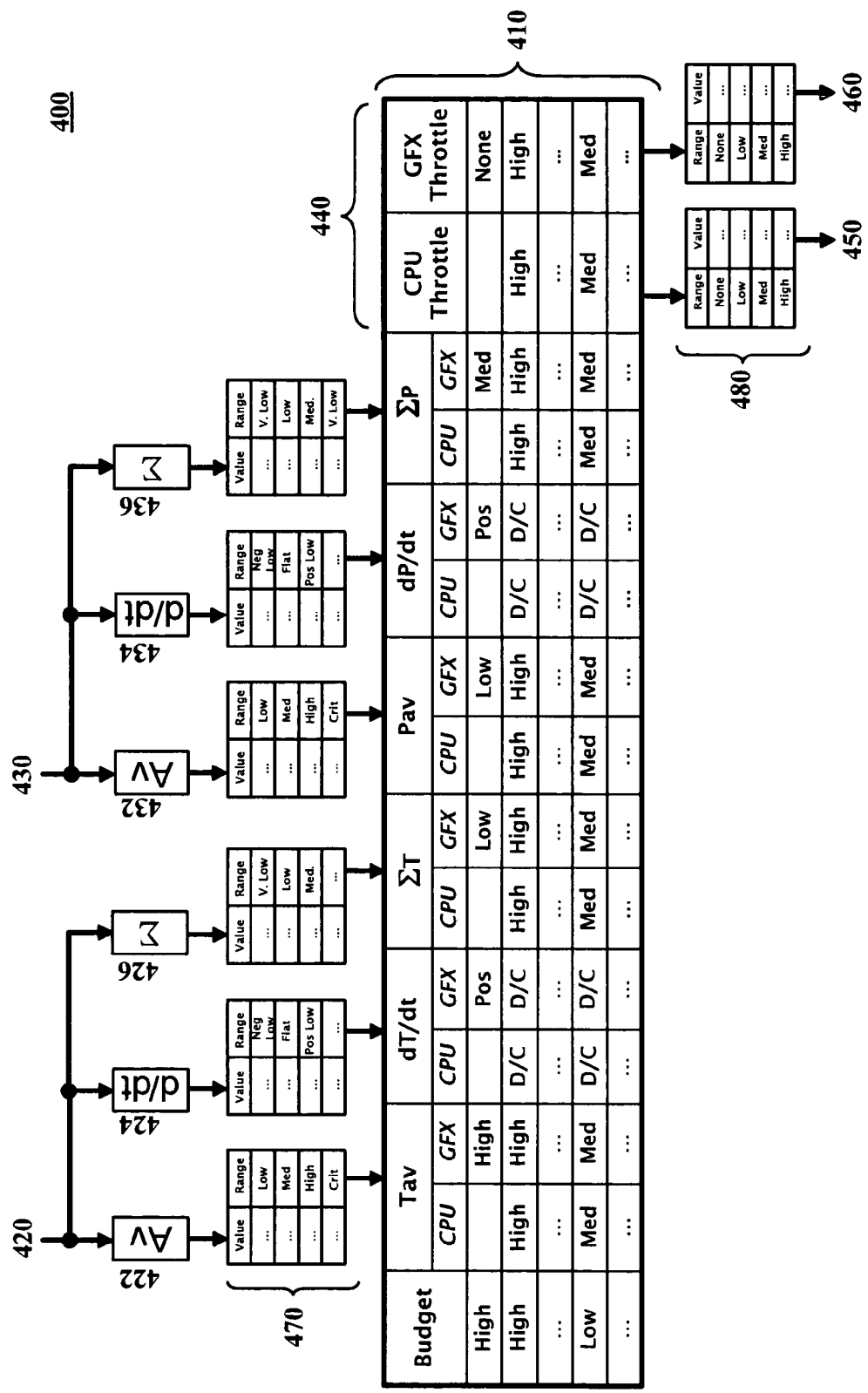
FIG. 4 illustrates a co-thermal controller with a table based rule generator according to one embodiment of the present invention.

FIG. 4 illustrates one embodiment of a CTC system 400 with a table based rule generator. A rule or decision table 410 may be used to determine what course of action should be taken in response to the state of two or more CHCs. The CHCs may be a CPU, a GMCH, a CPU memory controller hub, or other devices. The two or more CHCs may input the temperature 420, the power 430 or a different thermal characteristic. The temperature may be further divided into the average temperature 422, the temperature differential over time 424, or the temperature integral over time 426. The power may be further divided into the average power 432, the power differential over time 434, and the power integral over time 436. Based upon these inputs, the table 410 may output 440 instructions designating a course of action, either to the first CHC 450 or the second CHC 460. While a first CHC 450 and a second CHC 460 are described in this example, the table 410 may proscribe a course of action in any number of CHCs. Additionally, the state and the utilization of the plurality of CHCs may be another factor in the table. For example, if the CPU is in a more active state than the GMCH because a more processing intense activity is being executed, then the table may factor that into determining which CHC is throttled.

The temperature input 420 and the power input may be weighted by an input weighting unit 470 before being sent to the table 410. The input weighting unit 470 allows an analog input to be more accurately placed in the table. For example, if an input may range from a value of 0 to 3, any input between 0 and 1 is weighted as low, any input between 1 and 2 is weighted as medium, and any input between 2 and 3 is weighted as high. The output 440 may be weighted by an output weighting unit 480 before being sent to the first CHC 450 or the second CHC 460. The output weighting may be calibrated to more accurately induce a selected CHC to perform the action dictated by the table 410. For example, the first CHC 450 may throttle its performance a medium amount in reaction to an output value of 2 while the second CHC 460 may throttle its performance a medium amount in reaction to an output value of 4. In this instance, an output 440 from the table 410 in the medium range would be converted by the weighting for the first CHC 450 into a output value of 2 and by the weighting for the second CHC into an output value of 4.

Figure 5:
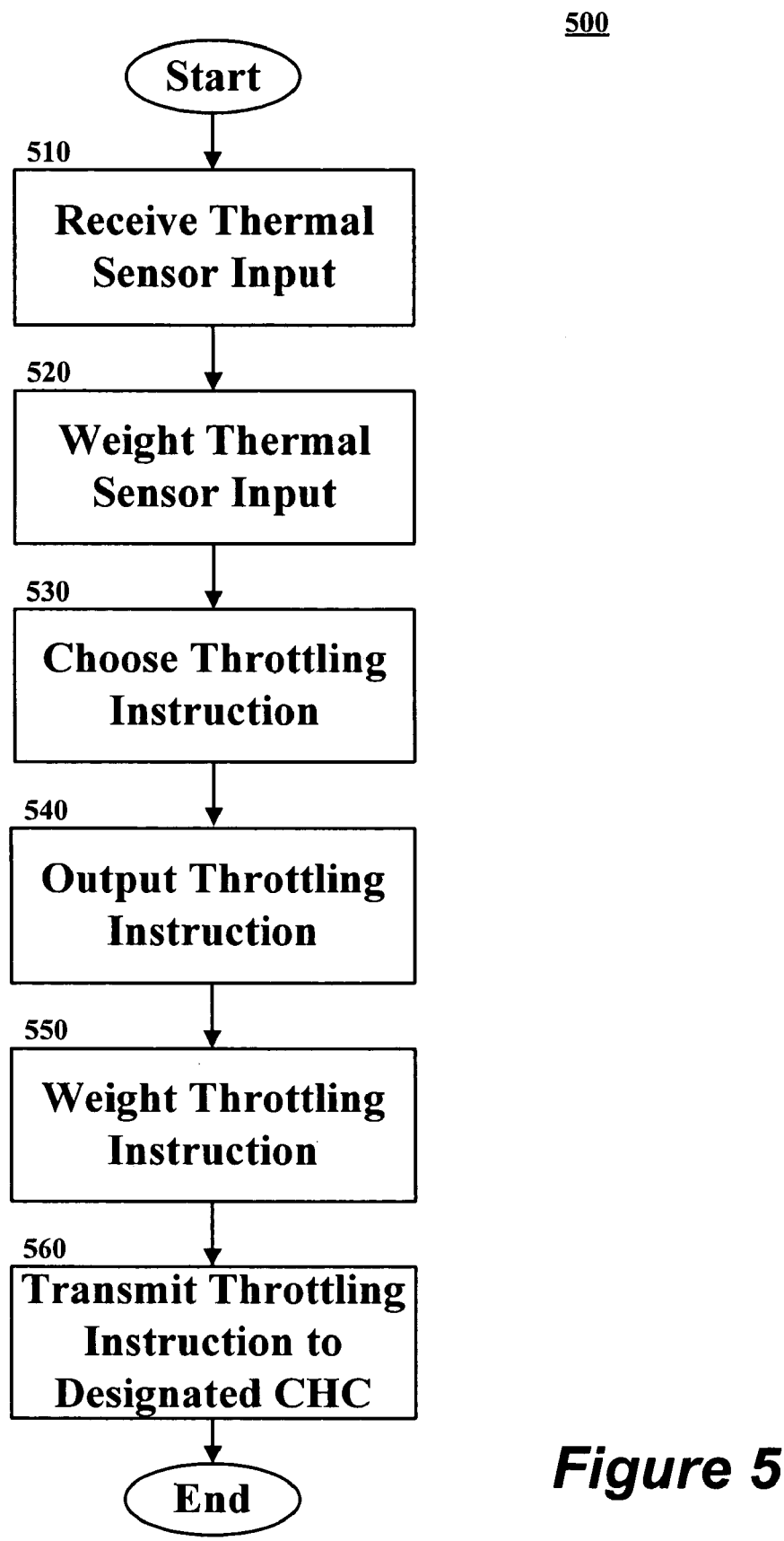
FIG. 5 illustrates in a flowchart a method to determine a proportional response by the system according to one embodiment of the present invention.

FIG. 5 illustrates in a flowchart one embodiment of a method 500 to determine a proportional response by the system. The CTC system 223 receives input from the thermal sensor 222 (Block 510). The thermal sensor input is weighted (Block 520). The CTC system 223 chooses a course of action using the table-based rule generator 410 (Block 530). The table-based rule generator 410 outputs a throttling instruction (Block 540). The throttling instruction is weighted (Block 550). The throttling instruction is then transmitted to the designated CHC (Block 560).

The CTC system may also be used to prevent a CHC from being taken over by another component. FIG. 6 illustrates one embodiment of a table 600 to be used by the table-based rule generator in determining a response to a Processor Hot (PROCHOT) signal. In one embodiment, the table-based rule generator resides on a CTC system in a CHC, in this instance the CPU. In alternate embodiments, the CHCs may be a CPU, a GMCH, or a CPU memory controller hub. The PROCHOT signal 610 may be asserted or not asserted. A power sensor may input the average power 620, the power differential over time 630, and the power integral over time 640. Additionally or alternatively, other thermal information, such as the temperature, or the state of the two or more CHCs may be other factors in the table. The table may process these factors and determine which level of throttling 650 is performed on the CPU, or other CHC.

Figure 7:
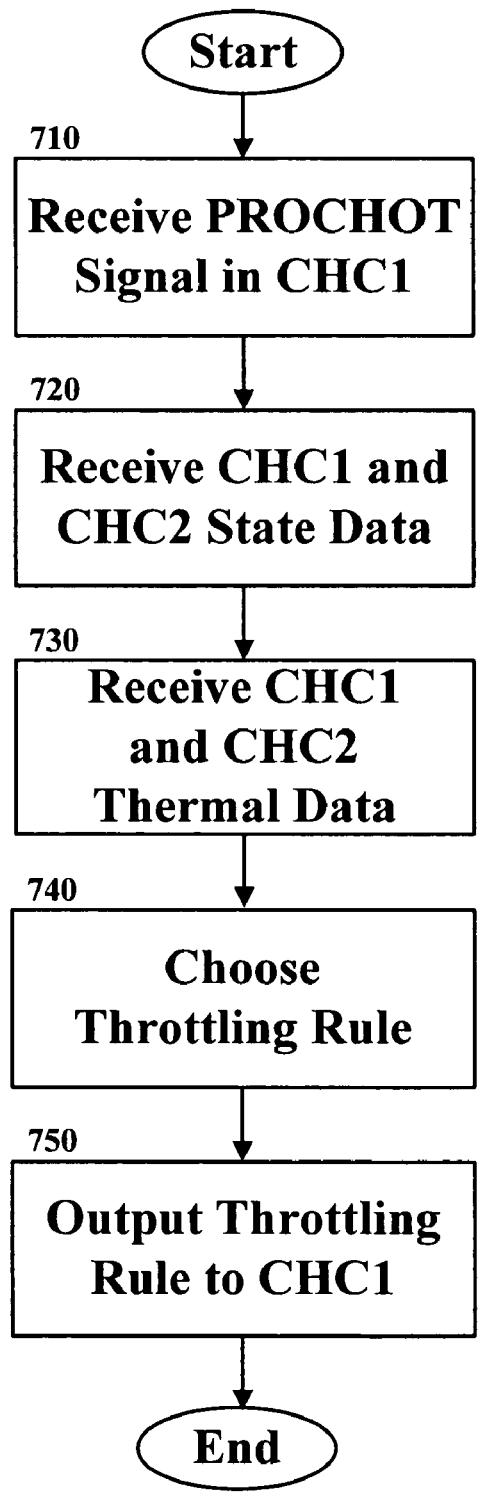
FIG. 7 illustrates in a flowchart one embodiment of a method to determine a proportional response to a PROCHOT signal according to one embodiment of the present invention.

FIG. 7 illustrates in a flowchart one embodiment of a method 700 to determine a proportional response to a PROCHOT signal. While a first CHC and a second CHC are described in this example, the CTC system 213 may proscribe a course of action in any number of CHCs. The CTC system 213 in the first CHC (CHC1) may receive a PROCHOT signal (Block 710). The CTC system 213 may then receive state data for the CHC1 and the second CHC (CHC2) (Block 720). The CTC system 213 may then receive thermal data, such as power and temperature, for CHC1 and CHC2 (Block 730). The CTC system 213 may then pick a throttling rule (Block 740). The CTC system 213 may then output a throttling rule to the CHC1 (Block 750), which then throttles its execution unit at a level proportionate to the throttling rule.

Embodiments of the present invention also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, compact disk-read only memories (CD-ROMs), and magnetic-optical disks, read-only memories (ROMs), random access memories (RAMs), erasable programmable read only memories (EPROMs), electronically erasable programmable read only memories (EEPROMs), magnetic or optical cards, or any type of media suitable for storing electronic instructions, and each coupled to a computer system bus. Instructions are executable using one or more devices (e.g., central processing units, etc.). In other embodiments, operations of the present invention might be performed by specific hardware components that contain reconfigurable or hardwired logic for performing the operations, or by any combination of programmed computer components and custom hardware components.

In the above description, for purposes of explanation, numerous specific details are set forth in order to provide a thorough understanding of the present invention. It will be apparent, however, to one skilled in the art that the present invention can be practiced without these specific details.

What is claimed is:

1. A method comprising:
   receiving a first signal indicating that a first condition for a first computer hardware component (CHC) has occurred;
   receiving state data for the first CHC and a second CHC;
   receiving thermal data for the first CHC and the second CHC;
   choosing a course of action using a table-based rule generator, the choosing to be at least partially based upon the first signal, the state data, and the thermal data; and
   outputting instructions to the first CHC for the course of action.

2. The method of claim 1, wherein the first signal is a signal from a sensor and the course of action is to send a second signal from the first computer hardware component to the second computer hardware component to throttle the second computer hardware component a proportional amount.

3. The method of claim 1, wherein the first signal is a Processor Hot (PROCHOT) signal and the course of action is to throttle the first computer hardware component a proportional amount.

4. The method of claim 1, further comprising:
   applying a weight to the first signal before inputting into the table-based rule generator; and
   applying a weight to the instructions derived from the table-based rule generator.

5. The method of claim 1, wherein the instructions for the course of action are further based upon at least one of a power condition or a utilization condition.

6. A set of instructions residing in a tangible storage medium to be executed by a processor to implement a method for processing data, the method comprising:
   receiving a first signal indicating that a first condition for a first computer hardware components has occurred;
   receiving state data for the first CHC and a second CHC;
   receiving thermal data for the first CHC and the second CHC;
   choosing a course of action using a table-based rule generator, the choosing to be at least partially based upon the first signal, the state data, and the thermal data; and
   outputting instructions to the first CHC for the course of action.

7. The set of instructions of claim 6, wherein the first signal is a signal from a sensor and the course of action is to send a second signal from the first computer hardware component to the second computer hardware component to throttle the second computer hardware component a proportional amount.

8. The set of instructions of claim 6, wherein the first signal is a Processor Hot (PROCHOT) signal and the course of action is to throttle the first computer hardware component a proportional amount.

9. The set of instructions of claim 6, further comprising:
   applying a weight to the first signal before inputting into the table-based rule generator; and
   applying a weight to the instructions derived from the table-based rule generator.

10. The set of instructions of claim 6, wherein the instructions for the course of action are further based upon at least one of a power condition or a utilization condition.

11. A co-thermal control system comprising:
    an input port to receive a first signal indicating that a first condition for a plurality of computer hardware components has occurred, the input port further to receive state data and thermal data; and
    a table-based rule generator to output instructions for a course of action at least partially based upon the first signal, the state data, and the thermal data.

12. The co-thermal control system of claim 11, further comprising:
    a sensor to send the first signal to the input port; and
    an output port to execute the course of action of sending a second signal to a computer hardware component of the plurality of computer hardware components to throttle the computer hardware component a proportional amount.

13. The co-thermal control system of claim 11, wherein the input port is a Processor Hot (PROCHOT) pin and the course of action is to throttle a computer hardware component a proportional amount.

14. The co-thermal control system of claim 11, further including:
    an input weighting unit to apply a first weight to the first signal into the table-based rule generator; and
    an output weighting unit to apply a second weight to instructions derived from the table-based rule generator.

15. The co-thermal control system of claim 11, wherein the instructions for the course of action are further based upon at least one of a state of one of the plurality of computer hardware components, a utilization condition, a power condition, or a temperature condition.

16. A system comprising:
    a plurality of computer hardware components including at least a first computer hardware component and a second computer hardware component;
    a co-thermal control system with a table-based rule generator to output instructions for a course of action at least partially based upon a first signal indicating a first condition for the plurality of computer hardware components, a state of the first or second computer hardware component, and thermal data of first or second computer hardware component; and a shared thermal cooling system to cool the plurality of computer hardware components.

17. The system of claim 16, further comprising:

a sensor to send the first signal to the second computer hardware component; and a processor side bus to execute the course of action of sending a second signal from the second computer hardware component to the first computer hardware component to throttle the first computer hardware component a proportional amount.

18. The system of claim 16, wherein the first signal is a Processor Hot (PROCHOT) signal and the course of action is to throttle the second computer hardware component a proportional amount.

19. The system of claim 16, wherein the first signal into the table-based rule generator and the instructions derived from the table-based rule generator are weighted.

20. The system of claim 16, wherein the instructions for the course of action are further based upon at least one of a power condition or a utilization condition.

* * * * *